(12) United States Patent
Schiveley et al.

(10) Patent No.: US 6,704,187 B2
(45) Date of Patent: Mar. 9, 2004

(54) EFFICIENT TERMINATION FOR WOUND CAPACITORS

(75) Inventors: Steve Schiveley, Forest Grove, OR (US); Mike Greenwood, Oregon City, OR (US); Tao Liu, University Place, WA (US); Peir Chu, Portland, OR (US); Aaron Steyskal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 09/961,600

(22) Filed: Sep. 24, 2001

(65) Prior Publication Data

US 2003/0058603 A1 Mar. 27, 2003

(51) Int. Cl.$^7$ .......................... H01G 4/32; H01G 4/236; H01G 9/10
(52) U.S. Cl. .................. 361/301.5; 361/307; 361/520; 361/538; 29/25.03
(58) Field of Search ................. 361/503–522, 361/531–538, 540, 301.5, 302; 29/25.03

(56) References Cited

U.S. PATENT DOCUMENTS

| | | | | |
|---|---|---|---|---|
| 3,244,946 A | * | 4/1966 | Hilton | 317/230 |
| 3,852,647 A | * | 12/1974 | Ishii | 29/25.03 |
| 3,866,095 A | * | 2/1975 | Marmorek | 174/50.57 |
| 4,037,142 A | * | 7/1977 | Poole | 174/52.3 |
| 5,379,181 A | * | 1/1995 | Ishii | 307/89 |

FOREIGN PATENT DOCUMENTS

| | | | | |
|---|---|---|---|---|
| JP | 4-10517 | * | 1/1992 | H01G/9/04 |
| JP | 4-10518 | * | 1/1992 | H01G/9/04 |
| JP | 4-10519 | * | 1/1992 | H01G/9/04 |

* cited by examiner

*Primary Examiner*—Dean A. Reichard
*Assistant Examiner*—Eric Thomas
(74) *Attorney, Agent, or Firm*—Blakely, Sokoloff, Taylor & Zafman LLP

(57) ABSTRACT

A termination assembly for a capacitor provides controlled ESR and ESL. First and second termination elements are attached to first and second foils to provide terminal connections. The first and second foils are wound into a cylinder such that the first and second termination elements form a shape within the cylinder and are spaced apart by a first distance. First and second leads are extending from the termination elements, respectively, such that the first and second leads are spaced apart by a second distance different from the first distance.

30 Claims, 10 Drawing Sheets

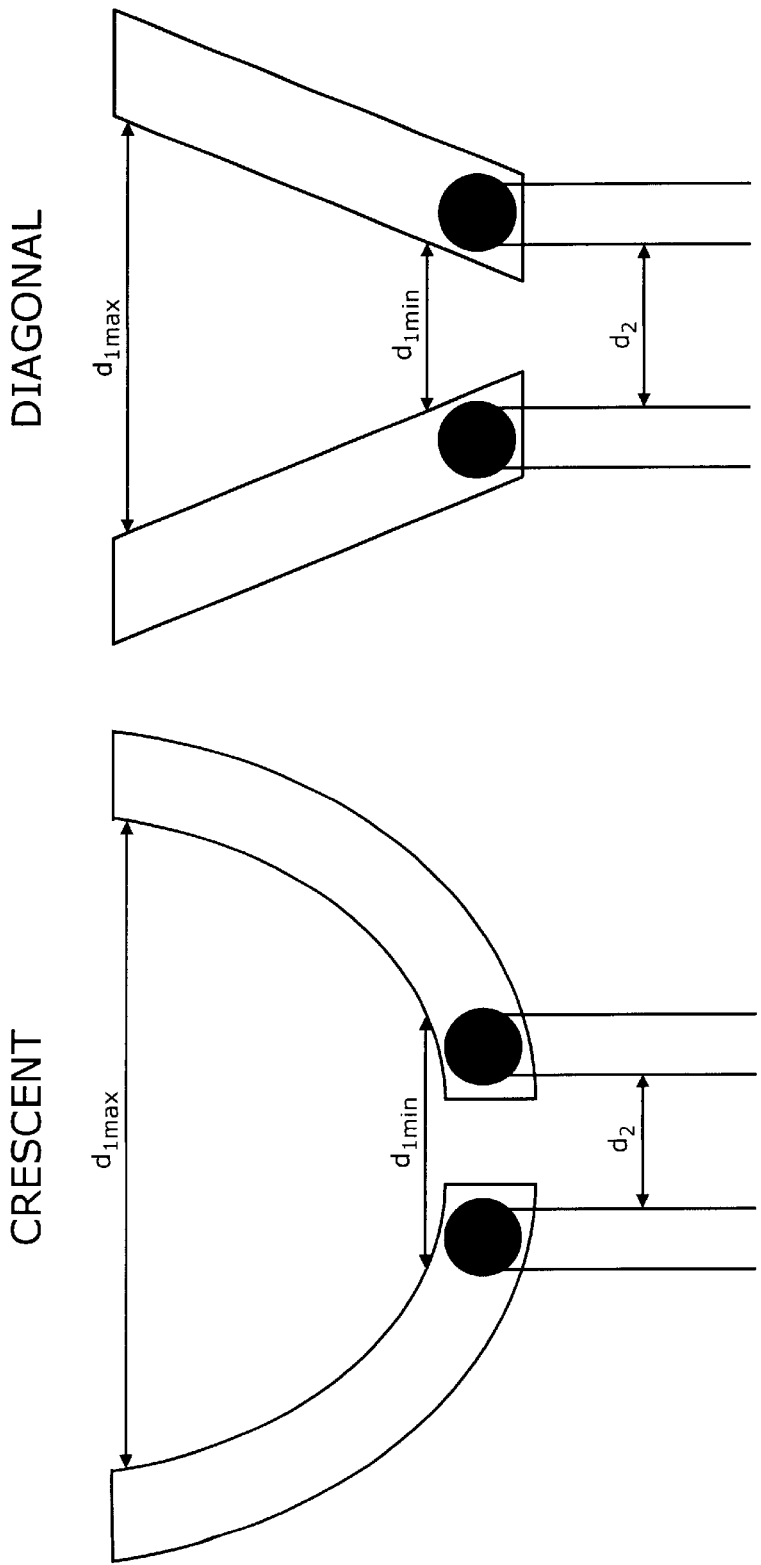

EFFICIENT TERMINATION FOR WOUND CAPACITORS

BACKGROUND

1. Field of the Invention

This invention relates to capacitors. In particular, the invention relates to wound capacitors.

2. Description of Related Art

Aluminum capacitors are popular in many applications due to low cost, versatility, high working voltages. They are useful in applications such as power supply filtering, low noise audio applications, and memory back-up. The performance of aluminum capacitors depends on many factors. Two important factors are equivalent series resistance (ESR) and equivalent series inductance (ESL). It is desirable to have low values for ESR and ESL. The ESR and ESL depend greatly on spacing between tabs or termination elements and leads.

Existing techniques can only provide a compromise between ESR and ESL performance. Typically, the terminations and the leads are welded into a straight line. This straight assembly of termination elements and leads does not provide design flexibility for good ESR and ESL performance.

Therefore, there is a need to have an efficient capacitor which can provide controlled ESR and ESL.

BRIEF DESCRIPTION OF THE DRAWINGS

The features and advantages of the present invention will become apparent from the following detailed description of the present invention in which:

FIG. 3C is a diagram to illustrate a crescent shape of the termination elements according to one embodiment of the invention.

FIG. 3D is a diagram to illustrate a diagonal shape of the termination elements according to one embodiment of the invention.

DESCRIPTION

One embodiment of the present invention is a termination assembly for a capacitor to provide controlled ESR and ESL. The termination assembly includes first and second termination elements and corresponding first and second leads. The first and second termination elements are attached to first and second foils to provide terminal connections. The first and second foils are wound into a cylinder such that the first and second termination elements form a shape within the cylinder and are spaced apart by a first distance. The first and second leads are extending from the termination elements, respectively, such that the first and second leads are spaced apart by a second distance different from the first distance.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc.

Figure 1:
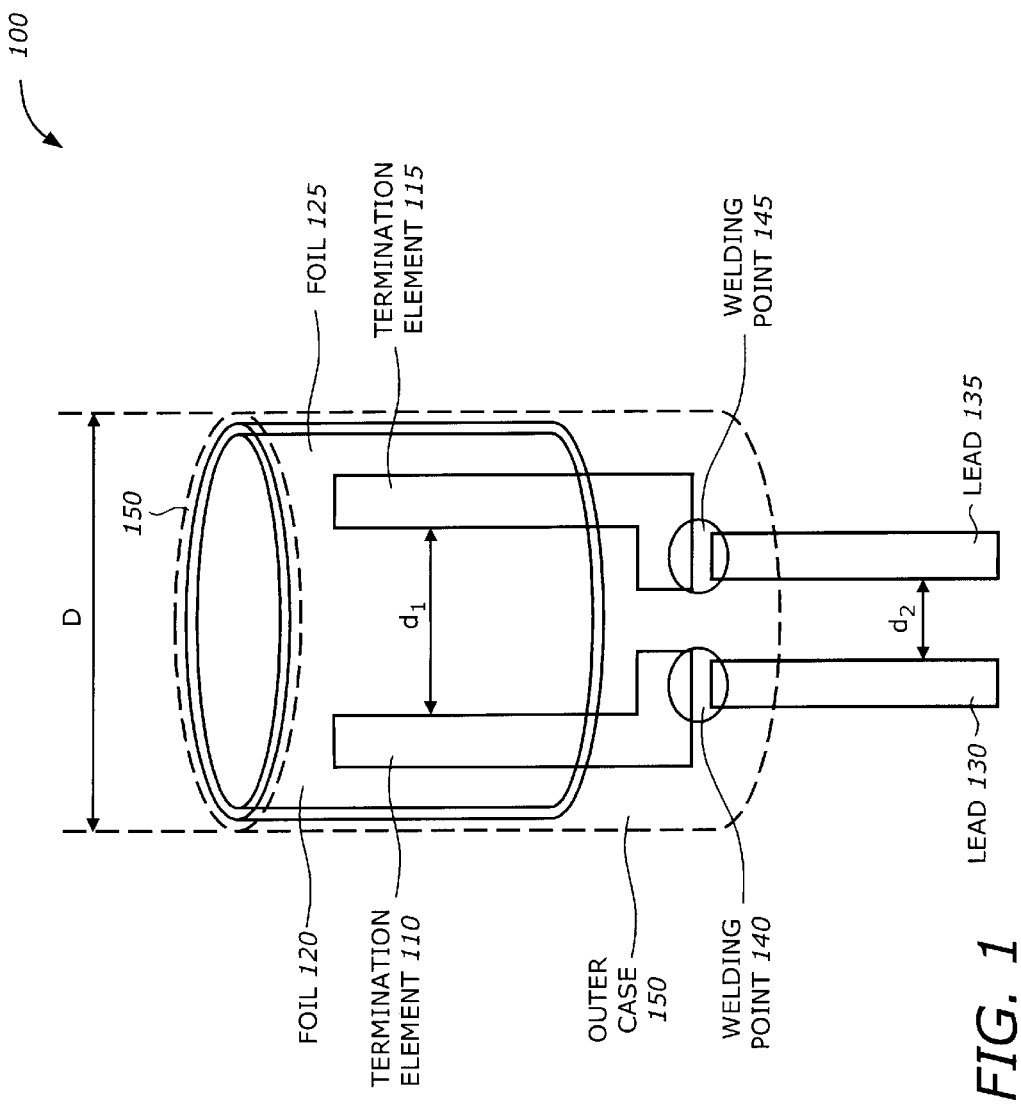
FIG. 1 is a diagram illustrating a capacitor in which one embodiment of the invention can be practiced.

FIG. 1 is a diagram illustrating a capacitor 100 in which one embodiment of the invention can be practiced. The capacitor 100 includes two termination elements 110 and 115, two foils 120 and 125, two leads 130 and 135, and an outer case 150.

The capacitor 100 may have a capacitance from less than 1 $\mu$F to greater than 1 farad. The capacitor 100 may be used in line-frequency power supply filtering, switching power supply filtering, audio direct current (DC) blocking, or in other low equivalent series resistance (ESR), low noise, and high temperature environments. The capacitor 100 is any wound-type capacitor with thin conductive foils and a thin insulative dielectric material, such as, but not limited to, aluminum electrolytic, aluminum type capacitor with an organic semi-conductive type electrolyte (OS-CON), or aluminum polymer.

The two termination elements, or tabs, 110 and 115 are attached to the foils 120 and 125, respectively, to provide terminal connections. The drawing of termination elements 110 and 115 are shown in FIG. 1 as a profile of the element for illustrative purposes. In actuality, these termination elements are wound with foils 120 and 125 within the outer case. Typically, the foils 120 and 125 are made of aluminum. These foils form the electrode and the counter electrode. Typically a layer of dielectric material is grown on one or both foils. The surface of one or both foil electrodes may be etched to increase the surface area.

The foils 120 and 125 are wound into a cylinder such that the termination elements 110 and 115 form a shape at center of the cylinder and are spaced apart by a distance d1. Depending on the shape formed by the two termination elements 110 and 115, the distance d1 may be uniform or non-uniform as shown in FIGS. 3A through 3H.

The leads 130 and 135 extend from the termination elements 110 and 115, respectively. In one embodiment, the leads 130 and 135 are welded to the termination elements 120 and 125, respectively, at two welding points 140 and 145. In another embodiment, the leads 130 and 135 are integral with the termination elements 110 and 115, respectively, as single pieces. In this embodiment, the welding points 140 and 145 are merely corner points at which the termination elements become the leads. In both embodiments, the leads 130 and 135 are spaced apart by a distance d2. Typically the leads 130 and 135 are placed in parallel and the distance d2 between them is substantially uniform. The welding points, or the corner points, 140 and 145 are selected such that distance d1 is different from the distance d2. The distance d1 may be shorter or longer than d2 depending on design criteria regarding ESL and ESR performance. When it is desired that d1 is longer than d2, the shape formed by the termination elements 110 and 115 is typically such that d1 is shortest ($d1_{min}$) at one end of the termination elements 110 and 115 and longest ($d1_{max}$) at the other end of the termination elements 110 and 115. The welding points 140 and 145 are typically at the ends where the distance d1 is approximately the shortest. When it is desired that d1 is shorter than d2 as in applications that need controlled ESR where specific, perhaps larger, ESR and ESL are needed, the shape formed by the termination elements 110 and 115 is typically such that d1 is longest ($d1_{max}$) at one end of the termination elements 110 and 115 and shortest ($d1_{max}$) at the other end of the termination elements 110 and 115. The welding points, or corner points, 140 and 145 are typically at the ends where the distance d1 is approximately the longest.

The dimensions of the capacitor 100 may vary greatly. The height may range from a few millimeters (mm) (e.g., 3.5 mm) to several inches. The dimensions of the termination elements, or tabs, 110 and 115 depend on the dimensions of the capacitor 100. The length may range from a few mm to a few inches. The thickness may range from less than 1 mm to a few millimeters. The width may range from less than 1 mm to above 1 inch. Typically the termination elements 110 and 115 are made of aluminum. The material for the leads 130 and 135 may be any conductive material such as tin, lead-containing tin on copper clad steel, silver plated on copper clad steel, bismuth-tin (Bi—Sn) plating on copper clad steel (lead free), and Bi—Sn plating on copper (lead free).

The outer case 150 provides sealing and encapsulation for the cylinder core and the terminal elements 120 and 125.

Figure 2:
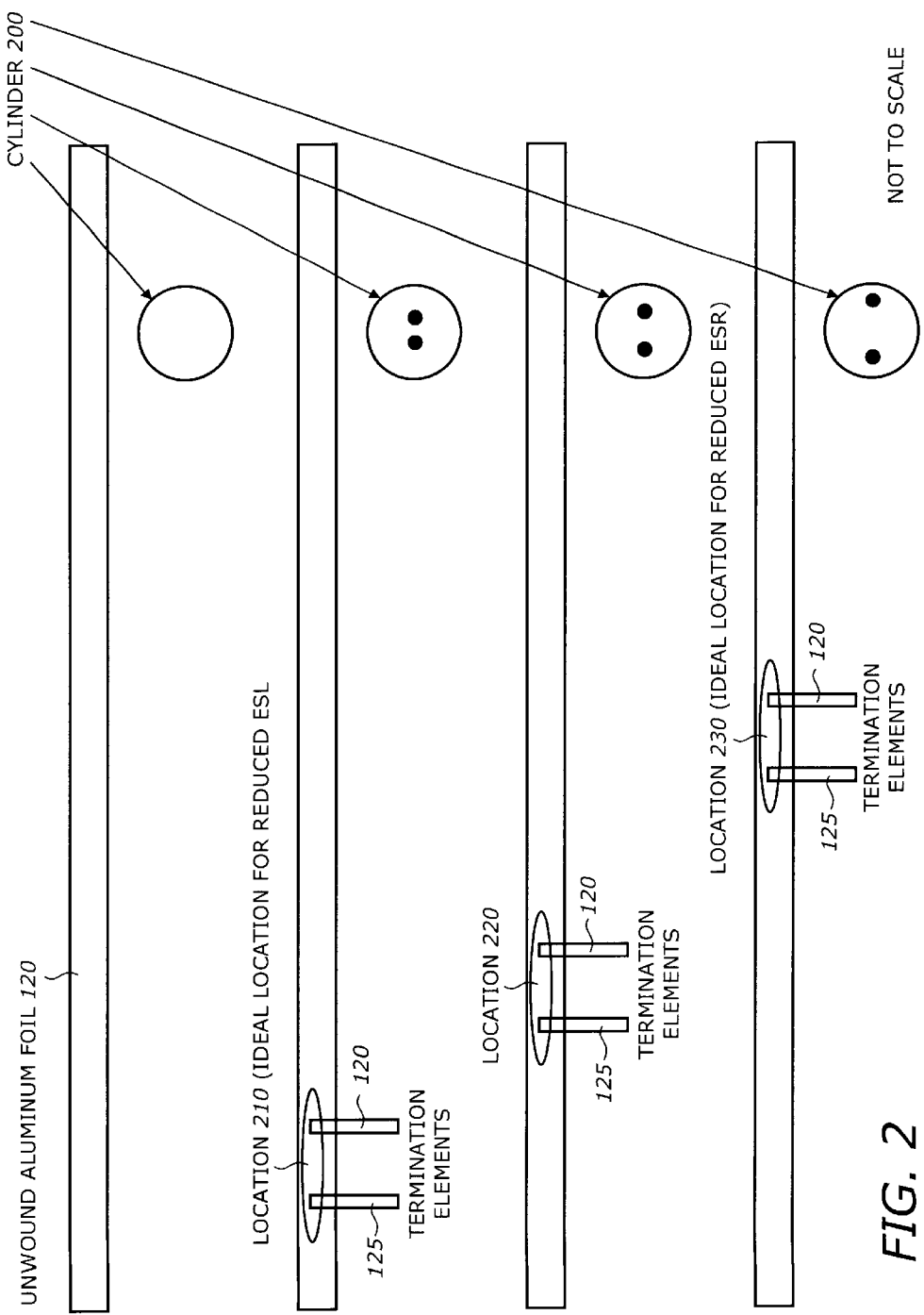
FIG. 2 is a diagram illustrating various locations of termination elements on the foils according to one embodiment of the invention.

FIG. 2 is a diagram illustrating various locations of termination elements on the foils according to one embodiment of the invention.

The unwound foil 120 forms a cylinder 200 when wound as shown. The termination elements 110 and 115 may be placed at locations 210, 220, or 230. The location 210 places the termination elements 110 and 115 closest to the center of the cylinder 200, a location most efficient for reducing ESL. The location 220 places the termination elements 110 and 115 at approximately equal distance from the center of the cylinder and the peripheral or the edge of the cylinder. The location 230 places the termination elements 110 and 115 at the center of the unwound foil, a location most efficient for reducing ESR. When the termination elements and the leads are welded in a straight line, these locations provide various compromises between the ESL and the ESR. None of these compromises is satisfactory for best performance of ESL and ESR. Location 210 leads to low ESL at the expense of high ESR. Location 220 leads to medium ESL and ESR. Location 230 leads to high ESL and low ESR.

The ideal location for the terminations is the location 230 where the ESR is at the lowest. However, a straight construction of the leads and the termination elements cause the undesirable high ESL in addition to the difficulty to control values of desirable ESL and ESR. The distances d1 and d2 have an effect on the resulting ESR and ESL. Therefore, by making these distances to be different, desirable ESR and ESL may be achieved. This can be achieved by constructing the termination elements 110 and 115 and the leads 130 and 135 such that they form a geometry that provide different values for d1 and d2. For example, the various shapes of the termination elements 110 and 115 located at or near this ideal location shown in FIGS. 3A through 3H provide shorter distance between the leads which leads to reducing the ESL without sacrificing the ESR performance. These shapes are merely representative. It is contemplate that any other shapes that have different distances d1 and d2 may be used.

Figure 3B:
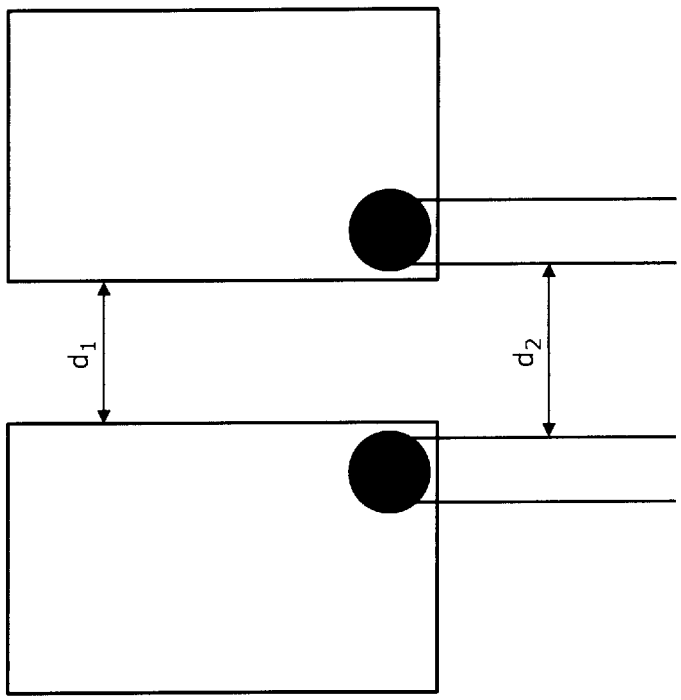
FIG. 3B is a diagram to illustrate a rectangle shape of the termination elements according to one embodiment of the invention.
Figure 3A:
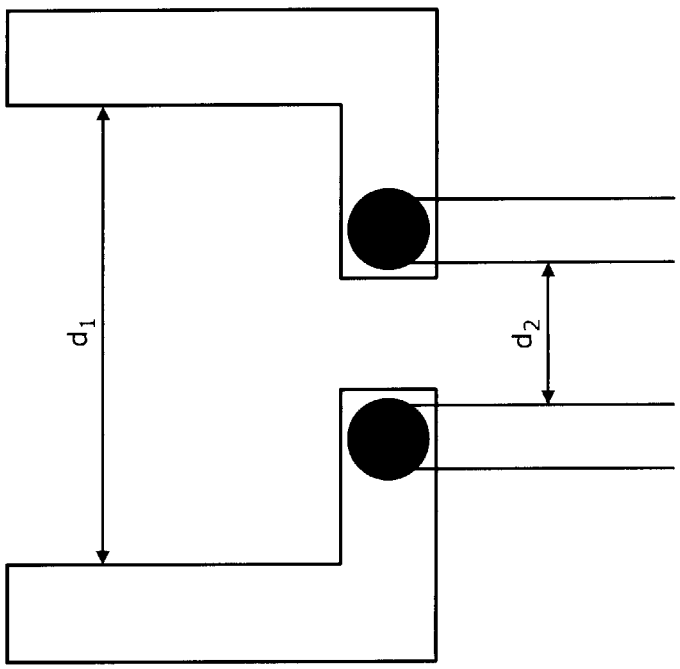
FIG. 3A is a diagram to illustrate an L-shape of the termination elements according to one embodiment of the invention.

FIG. 3A is a diagram to illustrate an L-shape of the termination elements according to one embodiment of the invention. The distance d1 between the two termination elements is constant or uniform within the cylinder formed by the foils. This distance d1 corresponds to the ideal location. The distance d2 between the two leads is shorter than d2 and leads to reduced ESL.

FIG. 3B is a diagram to illustrate a rectangle shape of the termination elements according to one embodiment of the invention. The distance d1 is uniform and somewhat shorter than d2 but the size of the termination elements is large.

FIG. 3C is a diagram to illustrate a crescent shape of the termination elements according to one embodiment of the invention. The distance d1 between the two termination elements is non-uniform ranging from $d1_{min}$ to $d1_{max}$ and non-linear but mostly longer than d2.

FIG. 3D is a diagram to illustrate a diagonal shape of the termination elements according to one embodiment of the invention. The distance d1 is non-uniform and linearly increasing from $d1_{min}$ to $d1_{max}$ from the welding points to the other end.

Figure 3F:
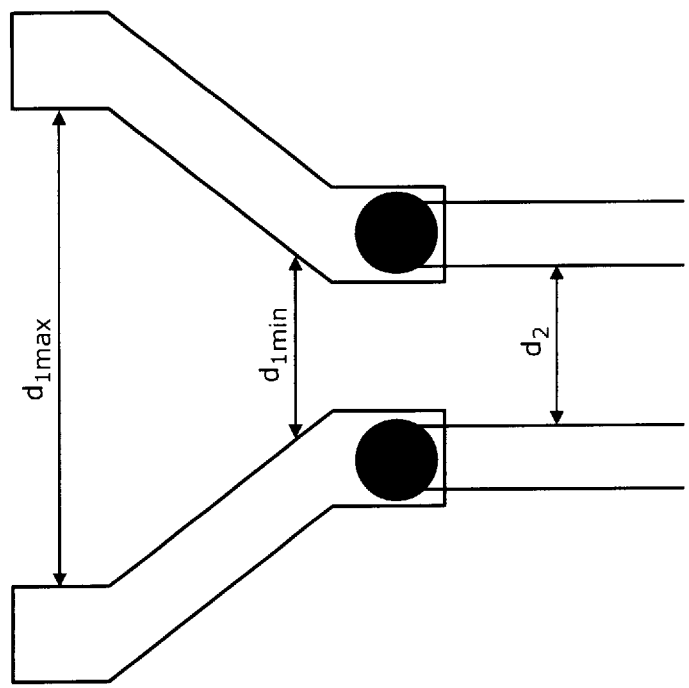
FIG. 3F is a diagram to illustrate a funnel shape of the termination elements according to one embodiment of the invention.
Figure 3E:
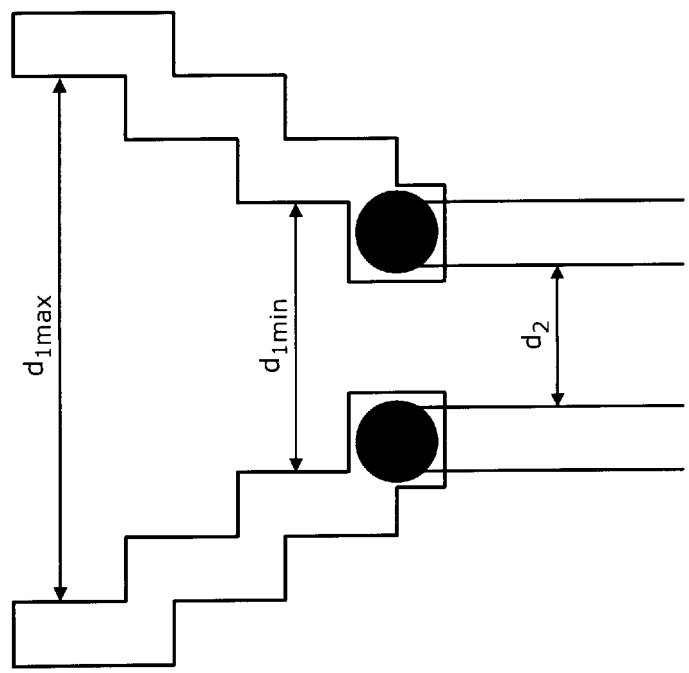
FIG. 3E is a diagram to illustrate a stair-step shape of the termination elements according to one embodiment of the invention.

FIG. 3E is a diagram to illustrate a stair-step shape of the termination elements according to one embodiment of the invention. The distance d1 is uniform within a step size and discretely increasing in steps.

FIG. 3F is a diagram to illustrate a funnel shape of the termination elements according to one embodiment of the invention. The distance d1 is non-uniform and linearly increasing in one segment, and then becomes uniform in another segment.

Figure 3H:
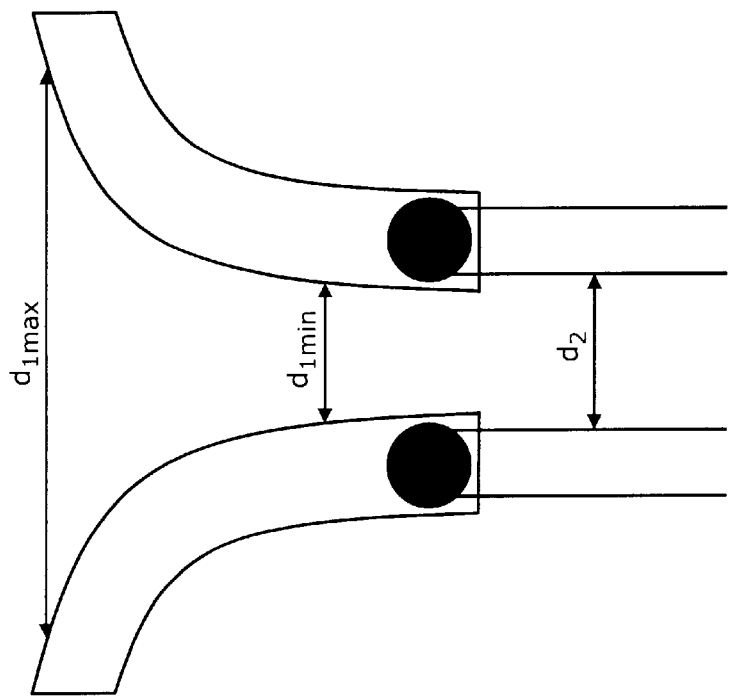
FIG. 3H is a diagram to illustrate a banana shape of the termination elements according to one embodiment of the invention.
Figure 3G:
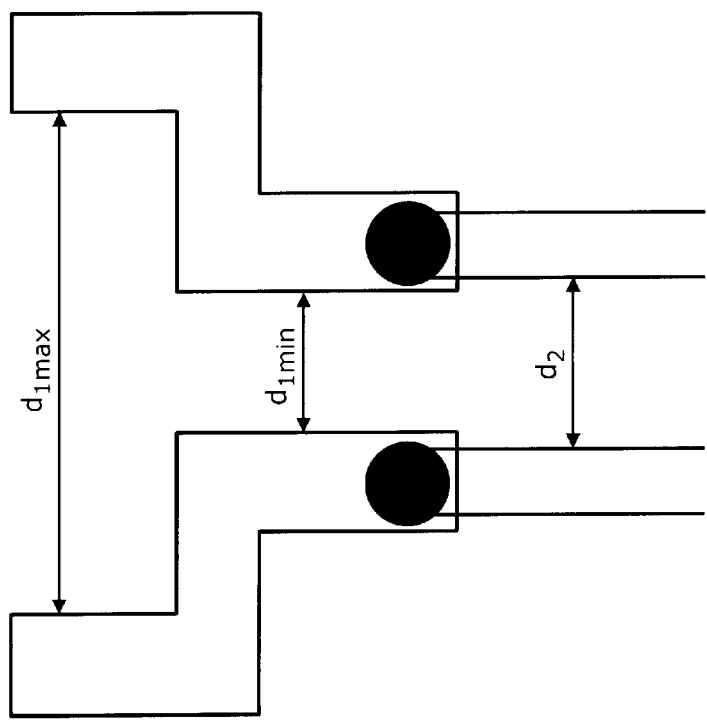
FIG. 3G is a diagram to illustrate a single step shape of the termination elements according to one embodiment of the invention.

FIG. 3G is a diagram to illustrate a single step shape of the termination elements according to one embodiment of the invention. The distance d1 is uniformly short at $d1_{min}$ in one segment and uniformly long at $d1_{max}$ in another segment.

FIG. 3H is a diagram to illustrate a banana shape of the termination elements according to one embodiment of the invention. The distance d1 is non uniform in an outward curvature from $d1_{min}$ to $d1_{max}$.

Figure 4A:
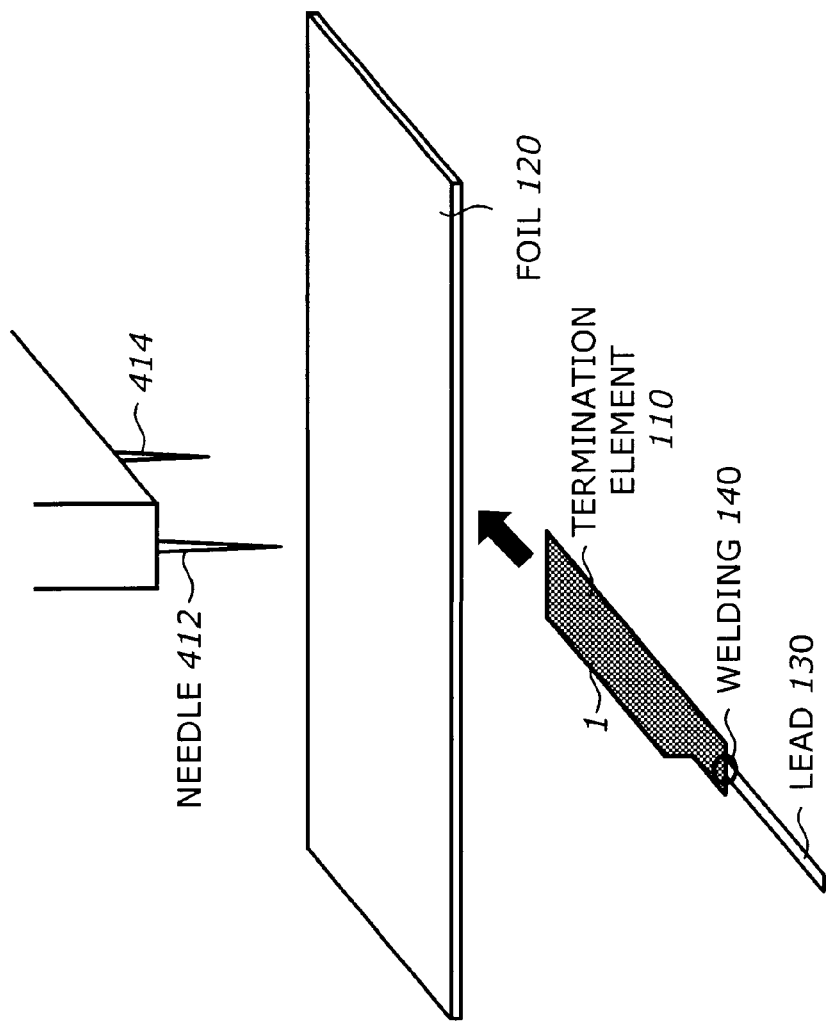
FIG. 4A is a diagram illustrating a process to prepare stitching the termination element onto the foil according to one embodiment of the invention.

FIG. 4A is a diagram illustrating a process to prepare stitching the termination element onto the foil according to one embodiment of the invention. The lead 130 is welded to the termination element 110 at the welding point 140. The unwound foil 120 is placed flat on a surface under the needles 412 and 414. The resulting assembly is prepared for stitching by the needles 412 and 414. The number of needles to be used may be more than 2.

Figure 4B:
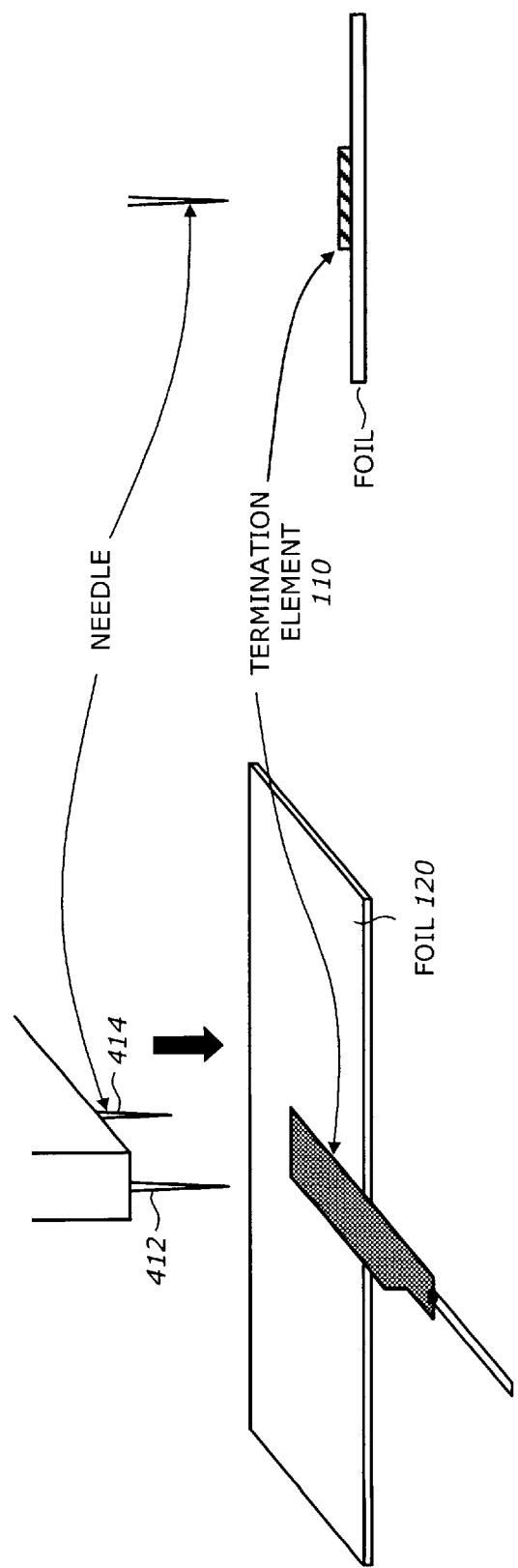
FIG. 4B is a diagram to illustrate a process to place the termination element onto the foil.

FIG. 4B is a diagram to illustrate a process to place the termination element onto the foil. The termination element 110 is placed on top of the foil 120, directly under the needles 412 and 414. The needles 412 and 414 are then pressed downward in the vertical direction to pierce through the termination element 110 and the foil 120 to create two holes.

Figure 4C:
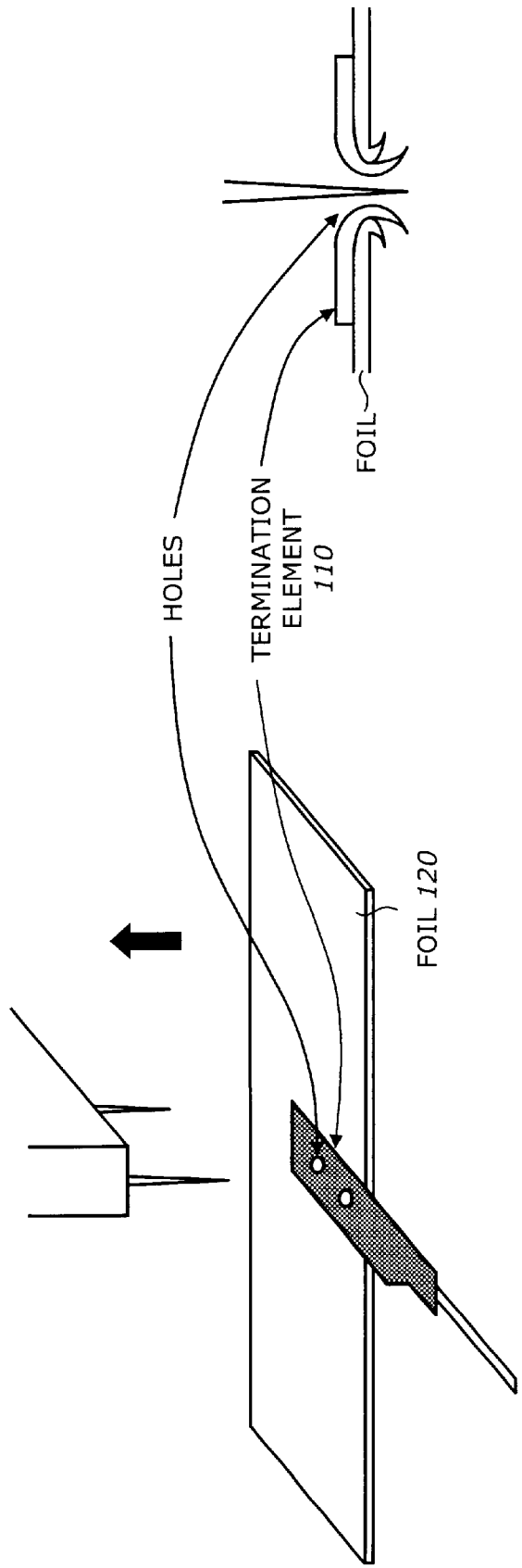
FIG. 4C is a diagram to illustrate a process to pierce a hole through the termination element and the foil.

FIG. 4C is a diagram to illustrate a process to pierce a hole through the termination element and the foil. The needles 412 and 414 are then moved upward. The piercing effect causes portions of the termination element 120 around the hole to bend into a V shape.

Figure 4D:
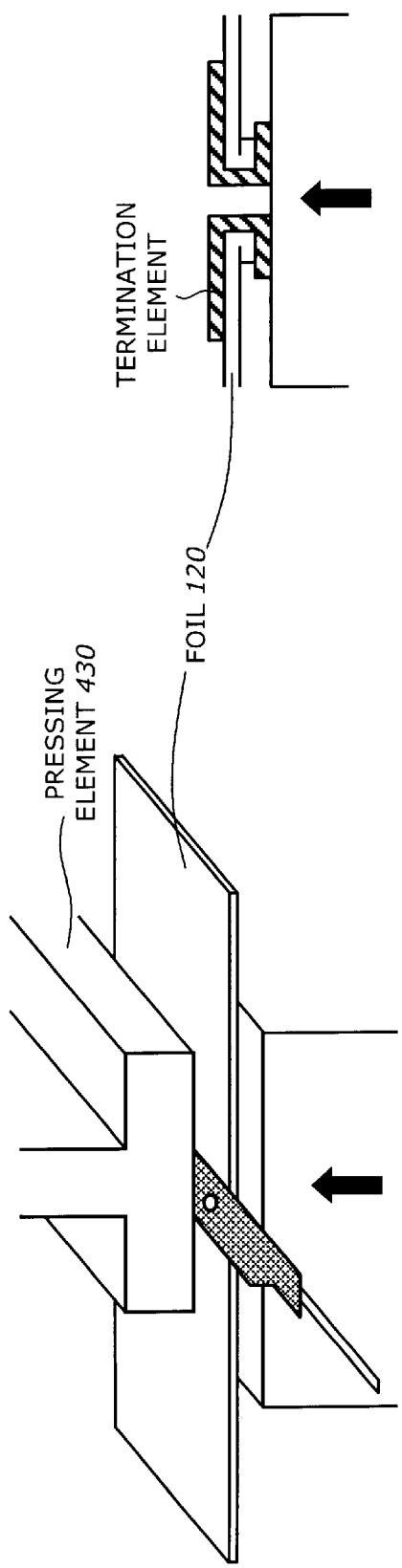
FIG. 4D is a diagram to illustrate a process to press the pierced termination element and the foil together.

FIG. 4D is a diagram to illustrate a process to press the pierced termination element and the foil together. The termination element 110 and the foil 120 are then pressed together under the pressing force by a pressing element 430. The pressing force presses the portions of the termination element 120 around the hole against the foil 120 such that the termination element 110 is firmly attached to the foil 120.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A termination assembly comprising:
    first and second termination elements attached to first and second foils to provide terminal connections, the first and second foils being wound into a cylinder such that the first and second termination elements form a shape within the cylinder and are spaced apart by a first distance at a first end and second distance at a second end, the first and second distances being different, the shape being one of an L-shape, a rectangle, a crescent, a diagonal shape, a stairstep, a funnel, a single step, and a banana shape; and
    first and second leads extending from the termination elements, respectively, such that the first and second leads are spaced apart by a third distance different from one of the first and second distances.

2. The termination assembly of claim 1 wherein the first and second leads are welded to the first and second termination elements, respectively.

3. The termination assembly of claim 1 wherein the first and second leads are integral to the first and second termination elements, respectively.

4. The termination assembly of claim 1 wherein the third distance is shorter than one of the first and second distances.

5. The termination assembly of claim 1 wherein at least one of the leads is made by a conductive material.

6. The termination assembly of claim 1 wherein the first distance is longer than the second distance.

7. The termination assembly of claim 1 wherein the first distance is shorter than the second distance.

8. The termination assembly of claim 1 wherein at least one of the first and second foils is made by aluminum.

9. The termination assembly of claim 1 wherein at least one of the first and second termination elements is made by aluminum.

10. The termination assembly of claim 1 further comprising:
    an outer case to house the foils and the termination elements.

11. A method comprising:
    attaching first and second termination elements to first and second foils to provide terminal connections, the first and second foils being wound into a cylinder such that the first and second termination elements form a shape at center of the cylinder and are spaced apart by a first distance at a first end and a second distance at a second end, the first and second distances being different, the shape being one of an L-shape, a rectangle, a crescent, a diagonal shape, a stairstep, a funnel, a single step, and a banana shape; and
    providing first and second leads extending from the termination elements, respectively, such that the first and second leads are spaced apart by a third distance different from one of the first and second distances.

12. The method of claim 11 wherein providing the first and second leads comprises welding the first and second leads to the first and second termination elements, respectively.

13. The method of claim 11 wherein providing the first and second leads comprises integrating the first and second leads to the first and second termination elements, respectively.

14. The method of claim 11 wherein the third distance is shorter than one of the first and second distances.

15. The method of claim 11 wherein at least one of the leads is made by a conductive material.

16. The method of claim 11 wherein the first distance is longer than the second distance.

17. The method of claim 11 wherein the first distance is shorter than the second distance.

18. The method of claim 11 wherein at least one of the first and second foils is made by aluminum.

19. The method of claim 11 wherein at least one of the first and second termination elements is made by aluminum.

20. The method of claim 11 further comprising:
    housing the foils and the termination elements by an outer case.

21. A capacitor comprising:
    first and second foils to provide electrodes;
    a dielectric material between the first and second foils to separate the first and second foils; and
    a termination assembly comprising:
        first and second termination elements attached to the first and second foils to provide terminal connections, the first and second foils being wound into a cylinder such that the first and second termination elements form a shape at center of the cylinder and are spaced apart by a first distance at a first end and a second distance at a second end, the first and second distances being different, the shape being one of an L-shape, a rectangle, a crescent, a diagonal shape, a stairstep, a funnel, a single step, and a banana shape, and first and second leads extending from the termination elements, respectively, such that the first and second leads are spaced apart by a third distance different from one of the first and second distances.

22. The capacitor of claim 21 wherein the first and second leads are welded to the first and second termination elements, respectively.

23. The capacitor of claim 21 wherein the first and second leads are integral to the first and second termination elements, respectively.

24. The capacitor of claim 21 wherein the third distance is shorter than one of the first and second distances.

25. The capacitor of claim 21 wherein at least one of the leads is made by a conductive material.

26. The capacitor of claim 21 wherein the first distance is longer than the second distance.

27. The capacitor of claim 21 wherein the first distance is shorter than the second distance.

28. The capacitor of claim 21 wherein at least one of the first and second foils is made by aluminum.

29. The capacitor of claim 21 wherein at least one of the first and second termination elements is made by aluminum.

30. The capacitor of claim 21 wherein the termination assembly further comprising:

an outer case to house the foils and the termination elements.

* * * * *